(12) United States Patent
Janutka et al.

(10) Patent No.: US 6,173,233 B1
(45) Date of Patent: Jan. 9, 2001

(54) BACK-UP PROXIMITY SENSOR FOR A VEHICLE EMPLOYING DUAL SONIC TRANSDUCERS

(75) Inventors: William J. Janutka, West Allis; Richard G. Bernhard, Germantown; Birger Pahl, Milwaukee, all of WI (US)

(73) Assignee: Eaton Corporation, Cleveland, OH (US)

( * ) Notice: Under 35 U.S.C. 154(b), the term of this patent shall be extended for 0 days.

(21) Appl. No.: 09/210,174

(22) Filed: Dec. 11, 1998

(51) Int. Cl.$^7$ .............................. G06F 17/10; G01S 13/00
(52) U.S. Cl. .................... 701/301; 701/47; 701/300; 340/436; 340/901; 340/903
(58) Field of Search .................... 701/300, 47, 301; 340/435, 903, 901, 904, 436

(56) References Cited

U.S. PATENT DOCUMENTS 5,940,011 * 8/1999 Agravente et al. ................. 340/903

* cited by examiner

Primary Examiner—William A. Cuchlinski, Jr.
Assistant Examiner—Arthur D. Donnelly
(74) Attorney, Agent, or Firm—Hoffmann & Baron, LLP

(57) ABSTRACT

A sonic back-up proximity sensor employs a first sonic transducer and a second sonic transducer mounted on a rearward portion of a riding lawn mower to create three discrete zones of protection. The first sonic transducer has an associated first region of coverage, or sector, and the second sonic transducer has an associated second sector. The first sonic transducer and second sonic transducer are directed toward one another such that the first sector and second sector at least partially overlap. The overlapping portion of the first sector and second sector provides redundant coverage in an area directly behind the lawn mower. The non-overlapping portion of the first sector defines a second protection zone on one side of the lawn mower. The non-overlapping portion of the second sector defines a third protection zone on a second side of the lawn mower. By selectively transmitting, receiving and sequentially storing reflected sonic energy, a sonic back-up proximity sensor formed in accordance with the present invention determines the distance and position of an object located behind the riding lawn mower.

23 Claims, 11 Drawing Sheets

FIG.10 Difference Filter

FIG. 11 3-Point Memory Cell Filter

BACK-UP PROXIMITY SENSOR FOR A VEHICLE EMPLOYING DUAL SONIC TRANSDUCERS

BACKGROUND OF THE INVENTION

1. Field of the Invention

The present invention relates generally to proximity sensors and more particularly relates to sonic proximity sensors adapted to sense targets, such as people and animals, which are located behind a vehicle.

2. Description of the Prior Art

The problem of detecting warm bodies, such as people and animals, in an area behind a vehicle is well established. The problem is especially acute in the field of farm tractors and lawn mowing equipment. Presently, more than five thousand injuries occur each year as a result of misuse of such equipment. A large percentage of these injuries are inflicted when a tractor is backing up and inadvertently strikes an unseen victim, resulting in impact injuries and lacerations from contact with a spinning lawn mower blade.

Various forms of electronic sensors have been employed in collision avoidance systems to detect targets in the path of a moving vehicle. These sensor types include radio-based sensors (radar), ultrasonic sensors, laser-based sensors and passive infrared sensors. Each of these sensor types has associated advantages and disadvantages. For example, radar-based systems have the ability to detect the position and relative speed of a target in the vicinity of a vehicle. However, such sensors are costly and are most responsive to hard, reflective surfaces such as other vehicles, buildings and the like. Infrared sensors, such as passive infrared sensors which are well known in the art, employ pyroelectric or thermopile detectors to sense the movement of a warm body in the sensor's field of view. Such sensors are commonly used in security systems to detect the presence of an intruder within a protected premise and have also been used in robotic systems to detect and track people in the vicinity of a mobil robotic system. While passive infrared sensors can discriminate between a warm body, such as a person, and inanimate objects, these sensors cannot determine the range of a target from a vehicle. Passive infrared sensors are also subject to false detection of a warm body due to thermal variation within the sensor's field of view.

It is well established that sonic sensors can be employed to detect the presence of a target in the proximity of a vehicle. Such technology, commonly referred to as sonar, transmits a burst of sonic energy which will reflect off a target proximate to a vehicle. After transmitting the burst of sonic energy, the sonar system enables a receiver to detect any reflected sonic energy. As the distance of a target is proportional to the time that it takes for the sonic energy to reach a target and return to the receiver, such sonar systems are capable of not only determining the presence of a target, but also can accurately render the distance of the target with respect to the vehicle.

The use of sonic sensors to detect obstacles in a region behind a moving vehicle is also known in the art. For example, the article "Limitations of Ultrasonic Obstacle Sensors for Industrial Lift Truck Applications," by Walter J. Girardi, published by SAE International, SAE Technical Paper Series No. 961809, discloses the use of an ultrasonic sensor on a lift truck to reduce accidents involving pedestrians and moving industrial lift vehicles. The system disclosed employs a single ultrasonic sensor mounted on a center portion of the rear of a lift truck. This system provides a conical protection area behind the vehicle and does not provide 180° coverage behind the lift truck. Accordingly, the system disclosed does not provide any coverage in the region directly to the left or the right of the rear of the vehicle, which are within the vehicles immediate turning radius. Therefore, while it is known to use ultrasonic sensors to detect the targets behind the vehicle, there are shortcomings with those devices known in the prior art and there remains a need for a back-up proximity sensor system for a vehicle which overcomes these problems.

OBJECTS AND SUMMARY OF THE INVENTION

It is an object of the present invention to provide a back-up proximity sensor which can detect targets in at least one region behind a vehicle.

It is another object of the present invention to provide a back-up proximity sensor for a vehicle which provides redundant sensor coverage in a region directly behind the vehicle.

It is yet another object of the present invention to provide a back-up proximity sensor for a vehicle which can determine the distance of a detected target behind the vehicle.

It is a further object of the present invention to provide a back-up proximity sensor for a vehicle which can determine the approximate direction of a detected target behind the vehicle.

It is still a further object of the present invention to provide a back-up proximity sensor for a vehicle which is substantially immune from both radio interference and thermal interference.

It is yet a further object of the present invention to provide a back-up proximity sensor that can reliably detect a target located within a 10 ft. radius about the rear portion of a vehicle.

It is still a further object of the present invention to provide a back-up proximity sensor which can detect a target and alter the operation of a vehicle within one second.

It is yet another object of the present invention to provide a back-up proximity sensor for a vehicle which provides coverage in a 180° region behind the vehicle.

It is still a further object of the present invention to provide a back-up proximity sensor that can reliably detect a target in a region behind a vehicle with up to one foot of vertical terrain variation.

It is another object of the present invention to provide a back-up proximity sensor employing sonic transducers which include a self test feature.

It is yet a further object of the present invention to provide a back-up proximity sensor employing sonic transducers having dynamic gain control to compensate for decreased return signal strength with increasing target distance.

In accordance with one form of the present invention, a back-up proximity sensor for a vehicle is formed with a first sonic transducer and a second sonic transducer mounted on a rear portion of a vehicle. The first sonic transducer and second sonic transducer each transmit and receive sonic energy in a substantially horizontal first sector and second sector respectively. The first sonic transducer is horizontally separated from the second sonic transducer and the first and second sonic transducers are angularly directed toward each other such that the first sector and second sector at least partially overlap.

The first and second sectors each preferably cover a region of about 90° with a radius of about 10 feet. The first and second sonic transducers are each angularly directed toward each other at approximately 45° such that the first sector overlaps the second sector in a region directly behind the vehicle. This provides three zones of coverage. The first zone of coverage features redundant protection in the region directly behind the vehicle where the first sector and second sector overlap. The non-overlapping regions of the first and second sectors extend laterally beyond the edges of the vehicle and define the second and third protected zones respectively. The second and third zones provide protection in the periphery of the vehicle such that the areas immediately to the left and right of the vehicle are protected, providing enhanced safety in the area of the turning radius of the vehicle.

In accordance with a method of detecting a target behind a vehicle, two sonic transducers are operated in a manner to provide three protection zones. During a first time period, the first sonic transducer transmits a pulse of sonic energy. During a second time period, the first and second sonic transducers are sampled to determine whether a target is within the first sector. During a third time period, the second sonic transducer transmits a pulse of sonic energy. During a fourth time period, the first and second transducers are sampled to determine whether a target is within the second sector. A "dead zone" time period is preferably generated at the end of the second and fourth sampling time periods so that the proximity sensor will not process late arriving reflected signals from out-of-range targets. The samples taken during the second and fourth time periods are sequentially stored in memory locations which correspond to target distance. If a target is detected in both the first and second sector, the target is within the first protected region. If a target is only detected in the first sector, then that target is within the second protected region. Similarly, if a target is only detected in the second sector, then that target resides in the third protected region. In this way, both the approximate angular position and distance can be determined for a detected target.

These and other objects, features and advantages of the present invention will become apparent from the following detailed description of illustrative embodiments thereof which is to be read in connection with the accompanying drawings.

DETAILED DESCRIPTION OF THE PREFERRED EMBODIMENTS

Figure 1:
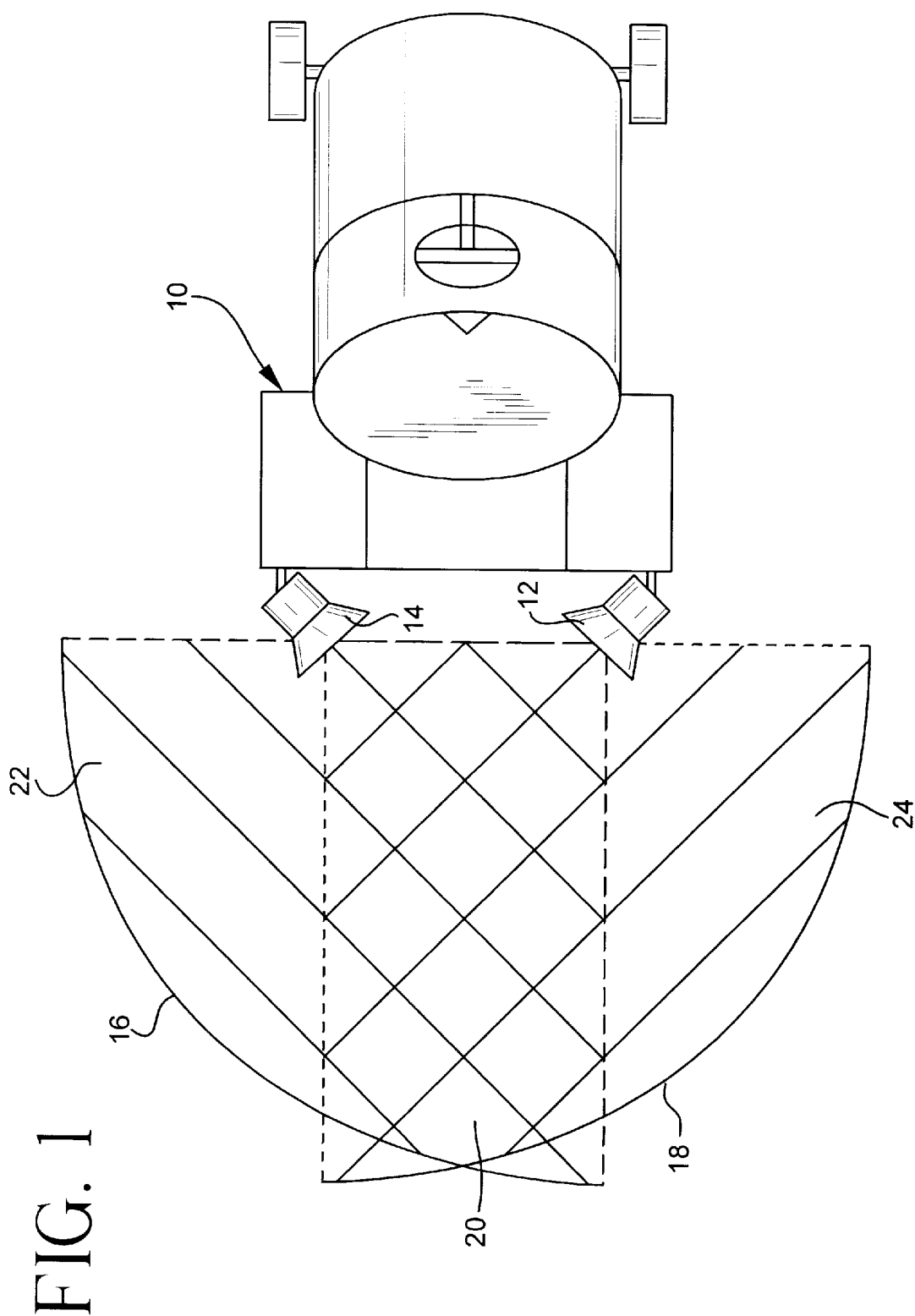
FIG. 1 is a top plan view of a vehicle employing a sonic back-up proximity sensor formed in accordance with the present invention.

A sonic back-up proximity sensor (BUPS) formed in accordance with the present invention is generally illustrated in FIG. 1. Referring to FIG. 1, a vehicle 10 is illustrated with a first sonic transducer 12 and a second sonic transducer 14 affixed to a rearward portion of the vehicle 10. The first sonic transducer 12 both transmits and receives sonic energy in a first sector 16. Similarly, the second sonic transducer 14 transmits and receives sonic energy in a second sector 18. Preferably, the first sonic transducer 12 and second sonic transducer 14 are canted inwardly at an angle such that the first sector 16 and second sector 18 at least partially overlap. In this way, three distinct protection zones are established.

A first protection zone 20 is defined by the intersection of the first sector 16 and second sector 18. When the first sonic transducer 12 and second sonic transducer 14 are directed at equal angles and are symmetrically spaced from the center of the vehicle, the first protection zone 20 protects a region immediately behind the vehicle 10. As the first protection zone 20 is formed by the intersection of the first sector 16 and second sector 18, the first protection zone features redundant coverage.

A second protection zone 22 is defined by the area of the first sector 16 which does not intersect with the second sector 18. As illustrated in FIG. 1, this is generally a region behind the vehicle 10 extending laterally beyond a first extent of the vehicle, e.g., the left side of the vehicle when the vehicle is viewed from the rear. A third protection zone 24 is defined by the area of the second sector 18 which does not intersect the first sector 16. Referring again to FIG. 1, this is the region extending laterally behind and beyond a second extent of the vehicle, e.g., the right side of the vehicle when the vehicle is viewed from the rear.

Figure 2:
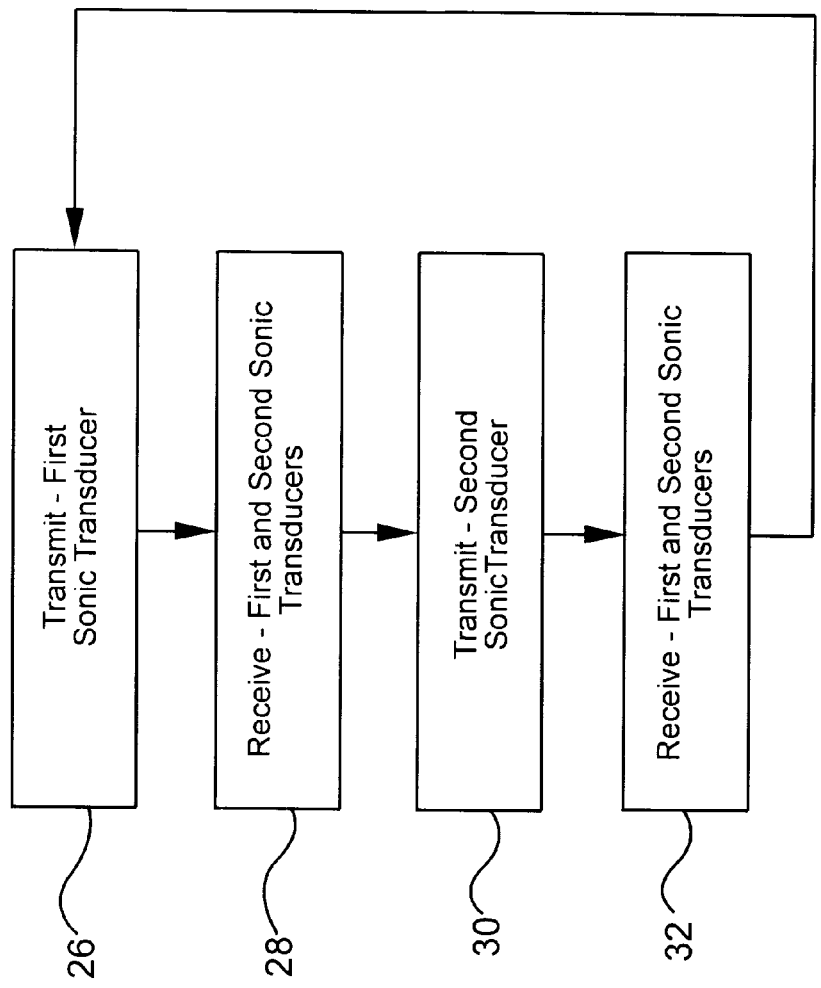
FIG. 2 is a flow chart illustrating the operation of a sonic back-up proximity sensor formed in accordance with the present invention.

The overall operation of a sonic BUPS formed in accordance with the present invention is generally illustrated in FIG. 2. Referring to the flow chart of FIG. 2, the operation of a sonic BUPS begins with one of the sonic transducers 12, 14 transmitting a burst of sonic energy. While either the first sonic transducer 12 or second sonic transducer 14 may be activated first, for the sake of convention it is assumed that the first sonic transducer 12 transmits initially. In this case, sonic energy is transmitted within the first sector 16 (block 26). This is referred to as the first time period and is bounded by times to and t, illustrated in FIGS. 5A–5D.

Following the first transmission, the first sonic transducer 12 and second sonic transducer 14 are responsive to reflected sonic energy which is incident upon the transducers. During a second time period, which is defined by times $t_1$ and $t_2$ in FIGS. 5A–5D, the first sonic transducer 12 and second sonic transducer 14 are sampled to determine whether sonic energy has reflected off a target (block 28). Preferably, a single sampling circuit is employed and the first sonic transducer 12 and second sonic transducer 14 are sampled on an alternating basis. The sampling takes a predetermined time per sample and the samples are sequentially stored in a memory circuit. As sonic energy travels through air at a substantially constant velocity, each sequential sample represents a fixed distance between a target and the vehicle 10. If a target is within the first protection zone 20, reflected sonic energy will be detected by both the first sonic transducer 12 and the second sonic transducer 14. If a target is within the second protection zone 22, only the first sonic transducer 12 will detect reflected sonic energy. During the first and second time periods, the third protection zone 24 is not active.

During a third time period, which is defined by times $t_2$ and $t_3$ in FIGS. 5A–5D, the second sonic transducer 14 transmits sonic energy into the second sector 18 (block 30). Following this transmission, the first and second sonic transducers 12, 14 are sampled as previously described and illustrated in FIGS. 5B and 5C (block 32). This sampling takes place during a fourth time period, which is bounded by times $t_3$ and $t_0$, the start of the next cycle. If a target is within the first protection zone 20, reflected sonic energy will be detected by both the first sonic transducer 12 and second sonic transducer 14. If a target is within the third protection zone 24, only the second sonic transducer 14 will receive reflected sonic energy. During the third and fourth time periods, the second protection zone 22 is not active. After the fourth time period, the sequence from block 26 through block 32 repeats.

Figure 5:
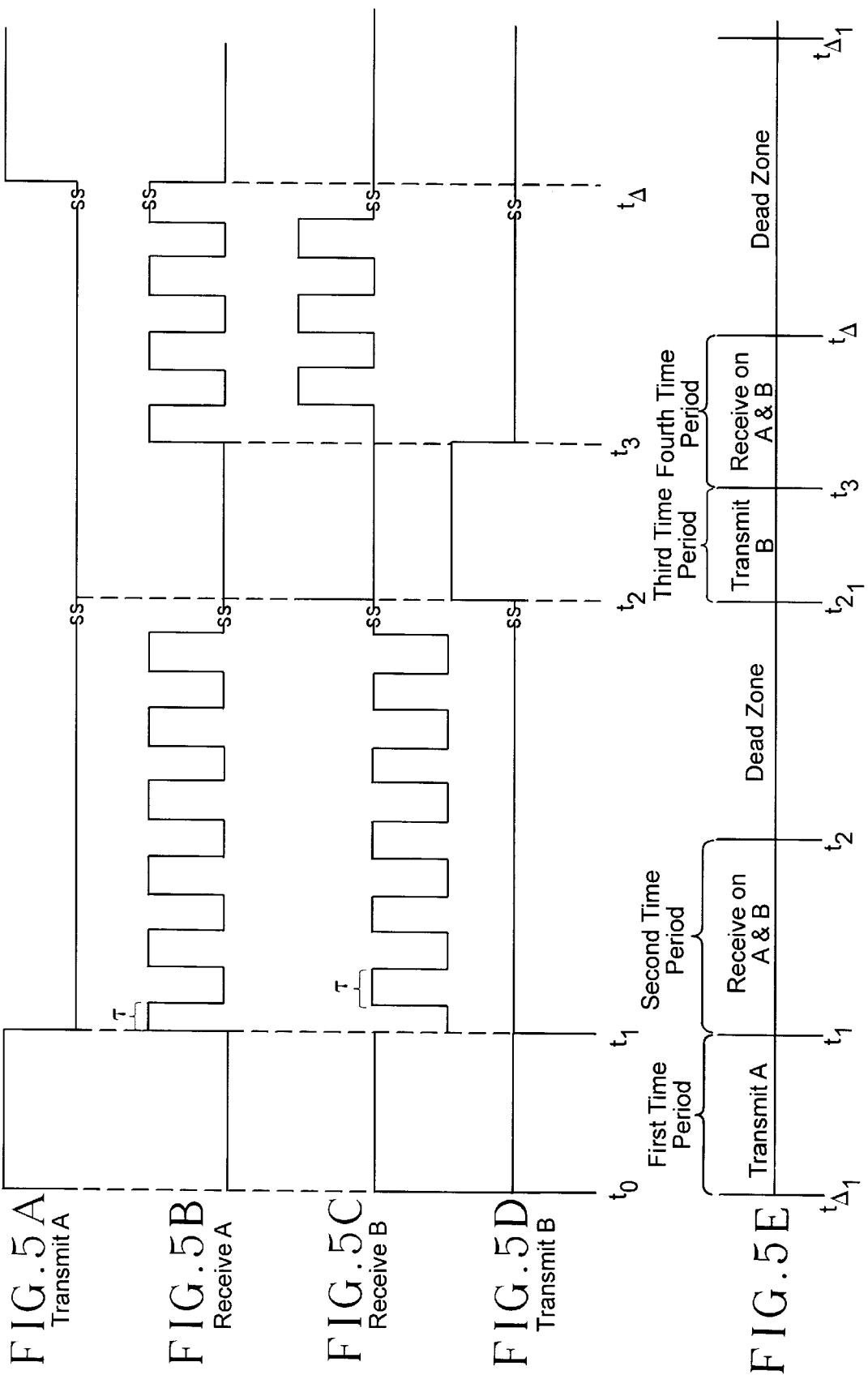
FIGS. 5A through 5D are timing diagrams illustrating the operation of a sonic back-up proximity sensor formed in accordance with the present invention.
FIG. 5E is a timing diagram illustrating the operation of an alternative form of a back-up proximity sensor formed in accordance with the present invention.

In another form of the present invention, and as shown in FIG. 5E, a "dead zone" defined by a time delay is created by the proximity sensor after the second sampling time period $t_1$–$t_2$ and after the fourth sampling time period $t_3$–$t_0$. The dead zones, shown in FIG. 5E as occurring during time intervals $t_2$–$t_{2_1}$, and $t_0$–$t_{0_1}$ are provided to prevent the proximity sensor from processing "late" reflected signals received from targets beyond the range of interest. As will be described in greater detail, the preferred range of interest from the tractor on which the proximity sensor is mounted to a target is about 10 feet. If the second and fourth sampling time periods are each set to receive signals reflected from targets no more than 10 feet away from the tractor, then it is possible for reflected signals corresponding to a transmission occurring during the first time period, $t_0$–$t_1$, for example, to be received by the proximity sensor from targets farther away than 10 feet during the fourth sampling time period, $t_3$–$t_0$, if no dead zones are provided, as shown in FIGS. 5A–5D.

Relatively long dead zones are provided between a transmission/receptionsampling cycle, each dead zone corresponding to preferably 50–100 feet in distance from the tractor to a possible target of no interest. By creating a time delay defining the dead zone, a microprocessor in the proximity sensor will not process and thus ignore signals reflected by out-of-range targets which are received by one or both of the first and second transducers 12, 14.

Figure 3:
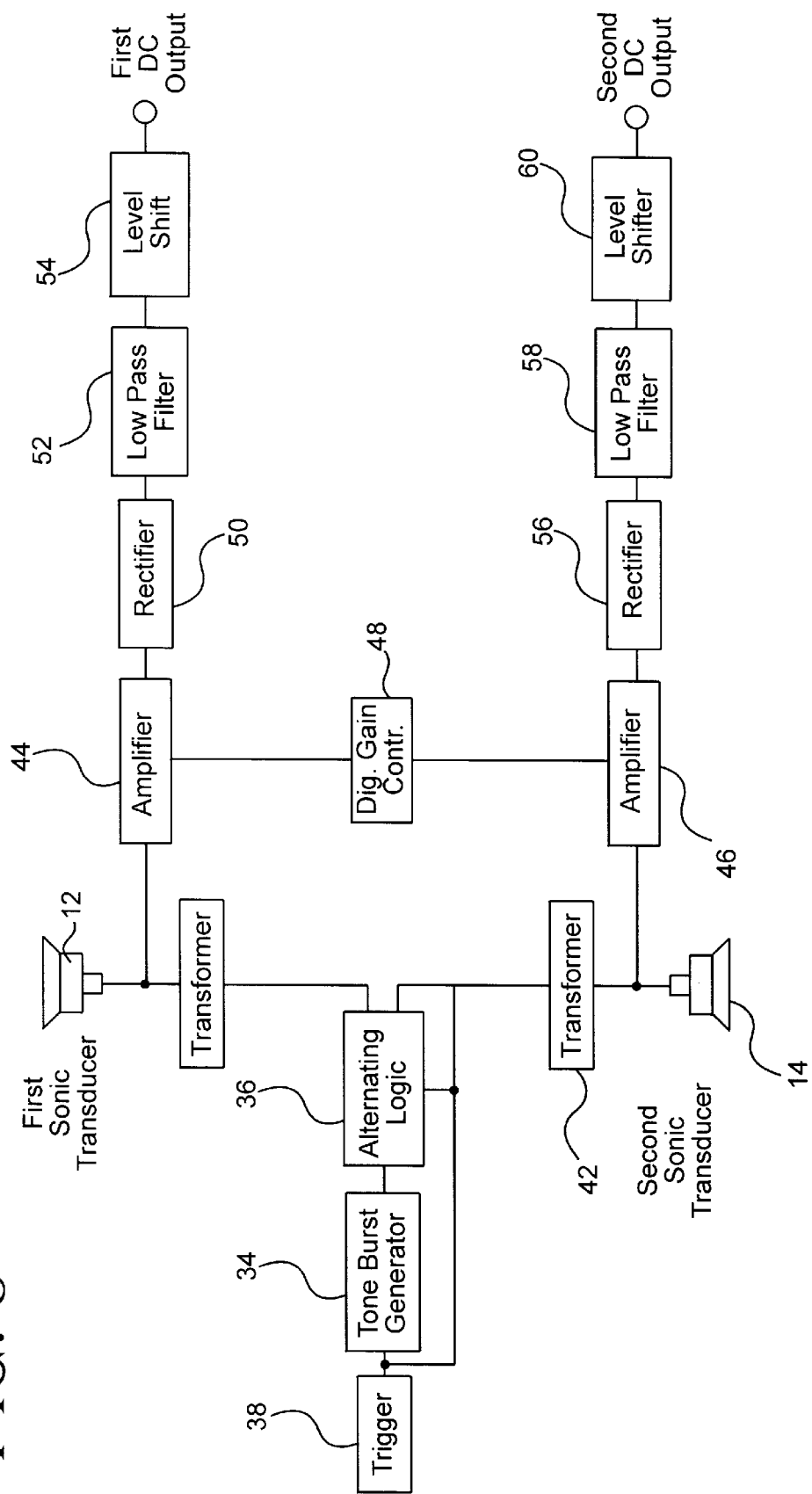
FIG. 3 is a block diagram of an exemplary transducer interface circuit formed in accordance with the present invention.

FIG. 3 is a block diagram of an exemplary transducer interface circuit formed in accordance with the present invention. The circuit includes a tone burst generator circuit 34 which generates an electrical signal to drive both the first and second sonic transducers 12, 14. The tone burst generator circuit 34 is preferably formed as a stable multivibrator circuit which may be assembled in any manner known in the art. For example, a CMOS logic Schmitt trigger inverter, such as Part No. 14584B (the generic member no. is 40106B), may be placed in an unstable, linear region by placing a 50 kilo (50,000) ohm potentiometer across the input and output of the inverter. A shunt capacitor from the input of the inverter to ground, together with the potentiometer, then determines the frequency of oscillation. Preferably, the tone burst generator circuit 34 produces a square wave "beep" signal at a frequency selected for optimum transducer performance. Typically, this is in the range of 15–50 kilohertz (kHZ), depending on the selected transducer. As the first sonic transducer 12 and second sonic transducer 14 do not need to transmit simultaneously, only a single tone burst generator circuit 34 is required to generate a signal for both transducers.

The transducer interface circuit further includes an alternating logic circuit 36 which receives the beep signal from the tone burst generator circuit 34 and selectively routes this signal to either the first sonic transducer 12 or the second sonic transducer 14. The alternating logic circuit 36 toggles the beep signal between the first sonic transducer 12 and second sonic transducer 14 in an alternating fashion in response to a received synchronizing timing pulse signal.

The transducer interface circuit further includes a trigger circuit 38 which generates the timing pulse signals which synchronize the signals illustrated in FIGS. 5A and 5D. The timing pulses activate the tone burst generator circuit 34 and synchronously toggle the alternating logic circuit 36.

Interposed between the alternating logic circuit 36 and the first sonic transducer 12 is a first audio transformer 40. The first audio transformer 40 is a step-up transformer which includes a primary and a secondary. The first audio transformer 40 receives the beep signal on the primary and produces an output signal with an amplitude of about 60–80 volts peak-to-peak which is presented on the transformer secondary. Preferably, the secondary of the first audio transformer 40 is part of a tuned circuit which is optimized for operation at the frequency of the beep signal. A second audio transformer 42, equivalent to the first audio transformer 40, is similarly interposed between the alternating logic circuit 36 and the second sonic transducer 14.

As previously described, during the second and fourth time periods, the first sonic transducer 12 and second sonic transducer 14 are responsive to sonic energy reflected off targets proximate to the rear of the vehicle 10. Sonic energy incident upon the first sonic transducer 12 and second sonic transducer 14 is transformed into a first received electrical signal and second received electrical signal respectively. The first and second received electrical signals are representative of the frequency and amplitude of the received sonic energy signals from the first and second sonic transducers respectively.

The first sonic transducer 12 is operatively coupled to a first amplifier circuit 44. The first amplifier circuit 44 receives and enhances the first received electrical signal. Similarly, the second sonic transducer 14 is operatively coupled to a second amplifier circuit 46 which receives and enhances the second received electrical signal.

As a transmitted sonic energy signal propagates, the amplitude of the signal decreases logarithmically with increasing distance. To provide a substantially constant output amplitude over increasing distance, it is preferred that the first amplifier circuit 44 and second amplifier circuit 46 each take the form of a digitally controlled, adjustable gain logarithmic amplifier. A suitable device is manufactured by Polaroid, model number SN 28784N.

When a digitally controlled amplifier is used, a digital gain control circuit 48 is also included. The digital gain control circuit 48 is responsive to the timing pulse signal from the trigger circuit 38. Upon detection of the trailing edge of a timing pulse signal ($t_1$ or $t_3$, FIGS. 5A, 5D), the digital gain control circuit 48 provides an initial signal to the first amplifier circuit 44 and second amplifier circuit 46 to minimize the gain of these amplifiers. This compensates for initial reflections which are from close targets and result in large signal reflections. The digital gain control circuit 48 then provides signals which progressively and incrementally increase the gain of the first amplifier circuit 44 and second amplifier circuit 46 during the second and fourth time periods. This compensates for decreased return signal amplitude over increasing time and distance.

The output signals from the first amplifier circuit 44 and second amplifier circuit 46 are generally alternating current (AC) electrical signals with frequency characteristics substantially matching the beep signal. Preferably, the output of the first amplifier circuit 44 is operatively coupled to a first rectifier circuit 50 which converts the AC signal to a direct current (DC) signal. The DC signal is presented on an output terminal of the first rectifier circuit 50.

The transducer interface circuit further includes a first low pass filter circuit 52. The first low pass filter circuit 52 is selected to have a cut off frequency which substantially removes the fundamental component of the beep signal without introducing excessive delay time into the received signal. A cut off frequency of about 240 Hz was found to be acceptable when the first time period and third time period were each selected to be 0.5 ms with the frequency of the beep signal selected to be approximately 20 kHZ.

The output signal from the first low pass filter 52 is preferably presented to a first level shifting circuit 54. The first level shifting circuit 54 receives the rectified and filtered signal from the first sonic transducer 12 and scales the DC signal to a range of 0–5 volts. The scaled voltage signal from the first level shifting circuit 54 is referred to as a first DC output signal.

Signals from the second amplifier circuit 46 are processed and conditioned in a similar manner to that described in connection with the first amplifier circuit 44. Following the second amplifier circuit 46 is a second rectifier circuit 56, a second low pass filter circuit 58 and a second level shifting circuit 60. These circuits are equivalent to those previously described in connection with the first amplifier circuit 44. The output signal from the second level shifting circuit 60 is referred to as a second DC output signal.

Figure 4:
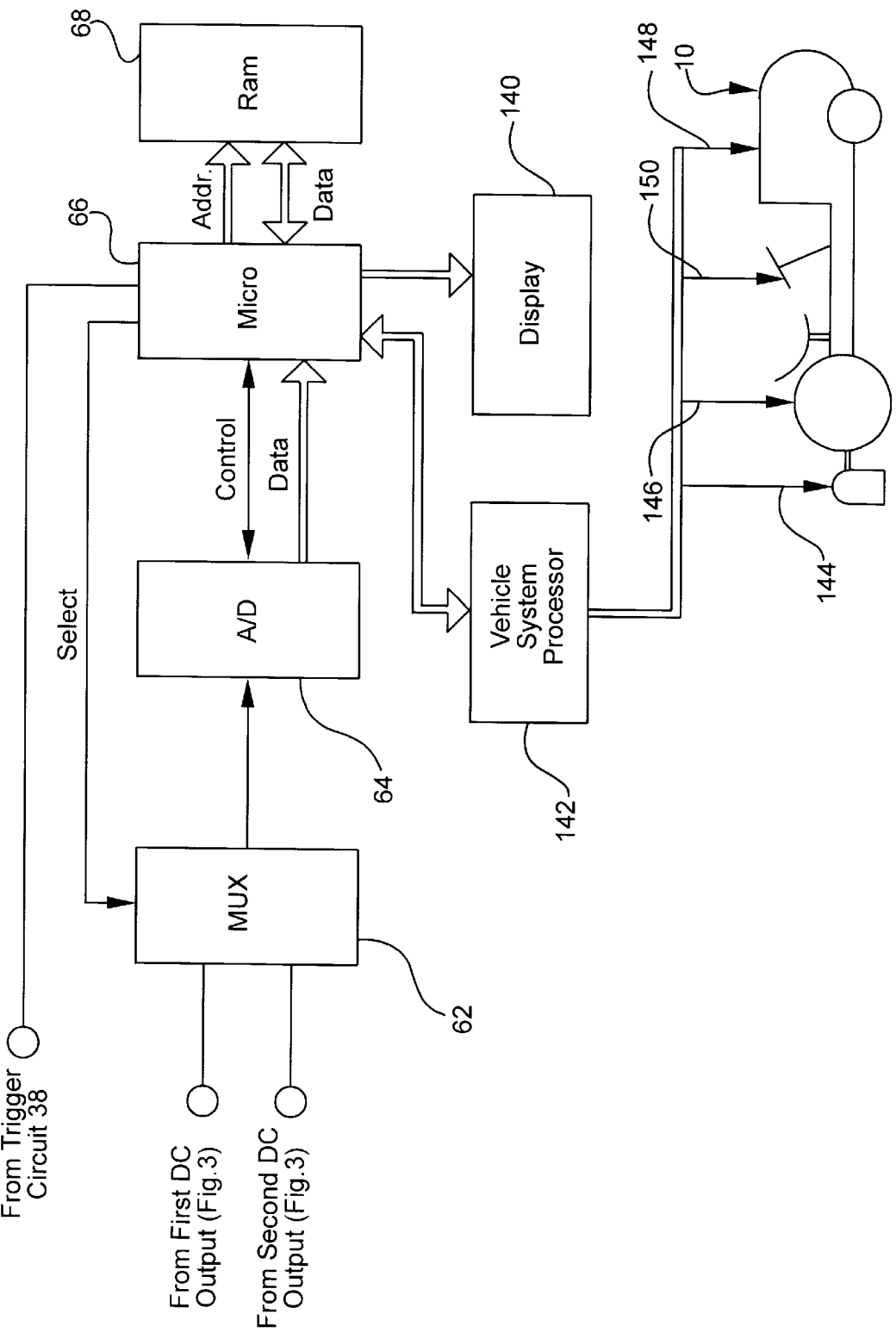
FIG. 4 is a block diagram of a transducer signal processing circuit formed in accordance with the present invention.

The first DC output signal and second DC output signal are preferably coupled to a signal processing circuit. FIG. 4 is a block diagram illustrating an exemplary signal processing circuit formed in accordance with the present invention. Preferably, the signal processing circuit includes an analog multiplexer circuit (MUX) 62 which receives the first DC output signal and second DC output signal from the first level shifting circuit 54 and second level shifting circuit 60, respectively. The analog multiplexer circuit 62 includes an input select line and an output line. In response to a received select signal presented on the input select line, the analog multiplexer circuit 62 selectively routes either the first DC output signal or second DC output signal to the output line.

The signal processing circuit further includes an analog to digital converter circuit (A/D) 64. The A/D 64 receives the first DC output signal and second DC output signal from the multiplexer circuit 62 on an alternating basis. The A/D 64 converts the received analog 0–5 volt DC signal to a corresponding digital signal suitable for digital processing and storage.

A microprocessor 66 is included in the signal processing circuit. The microprocessor 66 generates the select signal which is applied to the analog multiplexer circuit 62. The microprocessor 66 is also interfaced to the A/D 64. The microprocessor 66 provides control signals to the A/D 64 and receives the digital data corresponding to the analog first DC output signal and second DC output signal.

The signal processing circuit further includes electronic storage, such as random access memory (RAM) 68. The microprocessor 66 provides an address signal to the RAM 68, thereby selecting one of a plurality of storage locations within the RAM 68. The RAM 68 further includes a bidirectional data bus which is also connected to the microprocessor 66, facilitating the exchange of data back and forth between the microprocessor 66 and RAM 68 in a conventional manner well known in the art of digital circuit design.

Figure 6:
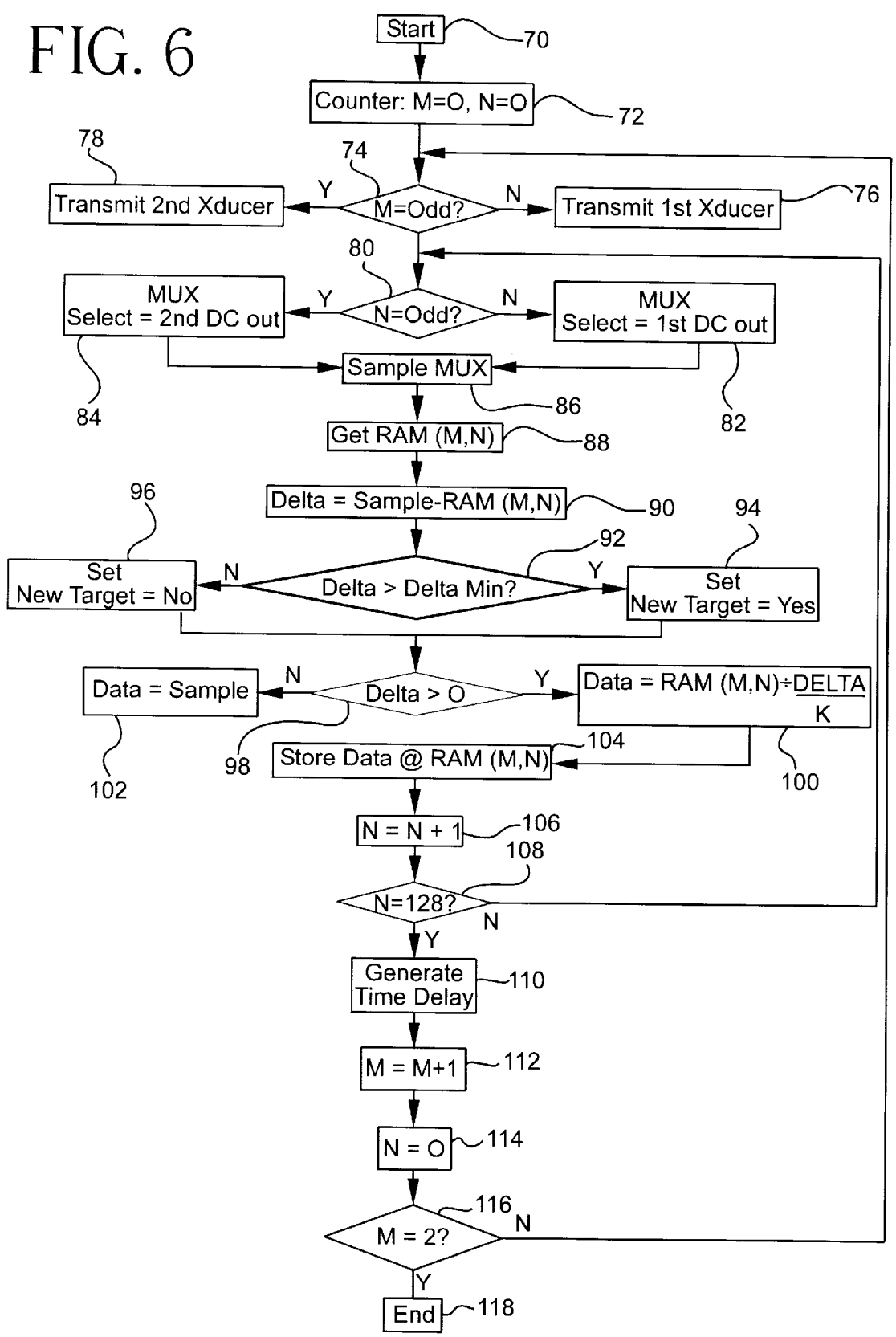
FIG. 6 is a flow chart illustrating the operation of a transducer signal processing circuit formed in accordance with the present invention.

During the second and fourth time periods illustrated in FIGS. 5A–5D, the signal processing circuit samples the first DC output signal and second DC output signal in an alternating fashion to determine whether a target is present. The operation of the signal processing circuit can best be described in connection with the flow chart of FIG. 6. The flow chart of FIG. 6 is initialized with a start block 70 which occurs prior to the leading edge of the transmit pulse illustrated in either FIG. 5A ($t_0$) or FIG. 5E ($t_{01}$). Upon the occurrence of this timing signal the microprocessor 66 initializes a counter, that is, the integer variables, M and N, are initially set as 0, as shown in the flow chart of FIG. 6 (block 72). The microprocessor 66 checks the status of variable M to determine which transducer should be transmitting a signal (block 74). If M equals 0 or an even numbered integer, for example, then the microprocessor will cause the first transducer 12 to transmit a signal, corresponding to the time interval $t_0$–$t_1$, (block 76). If M equals an odd numbered integer, then the microprocessor 66 will cause the second transducer 14 to transmit a signal, corresponding to the time interval $t_2$–$t_3$ (block 78).

The microprocessor 66 then checks the status of the counter to determine whether N is odd or even (block 80). If N is an even numbered integer, the microprocessor 66 sets the select line of the analog multiplexer circuit (MUX) 62 to a state which selects the first DC output signal from the first transducer 12 (block 82). If the microprocessor 66 determines that N is an odd numbered integer, the microprocessor 66 sets the select line of the MUX 62 to a state which selects the second DC output signal from the second transducer 14 (block 84). Blocks 82 and 84 correspond to the alternating receiving modes of transducers 12, 14 corresponding to time interval $t_1$–$t_2$ (when M equals an even numbered integer) and time interval $t_3$–$t_0$ (when M equals an odd numbered integer). As the counter increments, the select line of the MUX 62 is toggled to alternatively select the first and second DC output signals. Once the MUX select line is set in one of its two states, the A/D 64 performs a sampling of the DC voltage presented on the output of the MUX 62 (block 86).

The microprocessor 66 then sets an address bus value to the counter value, M, N and fetches the data contents stored in the RAM matrix location, RAM (M, N) (block 88). As each of the M, N memory locations in RAM 68 represents a distance from the vehicle 10 to a target, the value of RAM (M, N) represents the last sampling of that associated target distance. To determine whether a target is present, the microprocessor 66 compares the current sampled data to the data content previously stored in RAM (M,N) and determines the magnitude of the difference in those two values (delta ($\Delta$), block 90). Once a delta value is determined, the microprocessor 66 compares the delta value to a predetermined minimum value, "Delta Min" (block 92). If the delta value exceeds the predetermined minimum value then the microprocessor 66 sets a "new target" flag to "yes" (block 94). If the delta value is not greater than Delta Min, then the microprocessor 66 sets the new target flag to "no" (block 96). The purpose of the threshold, Delta Min, is to prevent a "new target" flag from being generated if the difference (Δ) between the new sample amplitude and the previously stored data is small. This will reduce the occurrence of false alarms.

In a preferred form of the present invention, a slow rise and fast fall method is used to establish the level of the reference (i.e., data). This method is accomplished in the manner described below.

The variable, delta (Δ), which is the difference between the previously stored data and the new sample, is compared with zero (block 98). If the delta (Δ) value is positive, then the amplitude of the new sample is greater than the data previously stored in memory, i.e., a stronger reflected signal is received. This may mean that the tractor carrying the proximity sensor is moving closer to a target, or the target is moving closer to the tractor. Under such circumstances, the data stored in the RAM is updated using a slow rise time method, such as a moving average, i.e., the data stored in memory is not immediately increased to the new sample amplitude, but rather is gradually increased over time. Preferably, the new data is calculated as the old data (what was stored in the corresponding RAM location previously) added with a percentage (i.e., 1/K, where K is a constant) of the difference (i.e., Δ) between the new sample and the previously stored data (block 100).

If the delta (Δ) value is negative, or zero, then the amplitude of the new sample is respectively less than or equal to the data previously stored in memory, i.e., a weaker or equally strong reflected signal is respectively received. This may mean that the tractor is moving away from the target or the target is moving away from the tractor, or the target and tractor are stationary. Under such circumstances, the data stored in the RAM is updated using a fast fall time method, i.e., the data stored in memory is replaced with the new sample amplitude (block 102). Using this method, if the tractor were stopped and no targets were moving, then eventually all of the data in the RAM would be continually updated with the sample data, which should remain the same with each update. The microprocessor then stores the new data in the RAM 68 at location RAM (M, N), thereby replacing the old value stored in that location (block 104).

After either the average value or sampled value is stored in RAM 68, the microprocessor increments the N counter (block 106). The microprocessor 66 then determines whether the counter value exceeds the predetermined maximum value (block 108). If the counter exceeds the maximum value, which is preferably equal to the maximum number of memory locations (e.g., 128) for receiving the reflected signals from one of the transducer's transmission, then the sampling process is complete for that transmission. If the value of the counter does not exceed the maximum value, then control of the program is routed back to block 80 to continue the sampling of reflected signals from that transmission.

When sampling of the reflected signals from one transducer's transmission, as shown in FIGS. 5B and 5C as occurring between intervals $t_1$–$t_2$ or $t_3$–$t_0$, is completed, the microprocessor preferably 66 generates a delay to create the "dead zone" (block 110). As mentioned previously, the purpose of this dead zone is to prevent the proximity sensor from reacting to "late" reflected signals received from targets beyond the range of interest (preferably, more than 10 feet from the tractor). Any signals received by the transducers 12, 14 during this dead zone are not processed and are ignored by the system.

The counter now increments the M integer by 1 (block 112), and further re-initializes the N integer with the value zero (block 114). If the microprocessor 66 determines that M is less than 2 (block 116), then it knows that the routine for one complete cycle has not been completed, and that it is necessary to now transmit a pulse from the other transducer (e.g., the second transducer 14). Under these circumstances, the microprocessor 66 repeats the same routine, starting at block 74.

If M equals 2 (block 116), then the microprocessor 66 knows that a full cycle has been completed, i.e., that each of the first and second transducers 12, 14 has transmitted a signal and that the echo signals have been processed. The routine (for one full cycle) is then terminated (block 118).

The speed of sound at room temperature is approximately 1.1 feet per ms (0.9 ms/ft). To cover an acquisition area with a radius of 10 feet, the sonic energy must travel a round trip of 20 feet when it is reflected off a target at this distance. Therefore, the subroutine illustrated in FIG. 6 should be repeated for at least 18 milliseconds (ms) in order to store values over the 10-foot radius. In a preferred embodiment of the present invention, the sampling routine of FIG. 6, block 80 through block 108, takes approximately 0.15 ms to complete. This provides a resolution per sample of approximately 2 inches. However, as this is the round trip time for the sonic energy, each sample and corresponding memory location corresponds to 1 inch of target distance.

To cover a region with a 10-foot radius, a minimum of 120 memory locations is required for each transducer. In order to provide a degree of additional coverage and fully utilize standard components, RAM 68 is preferably selected to include 256 storage locations, 128 allocated for the second time period (i.e., $t_1$–$t_2$) and 128 allocated for the fourth time period (i.e., $t_3$–$t_0$).

At the conclusion of the fourth time period, the microprocessor compares corresponding locations in RAM 68 for the second and fourth time periods. If the new target flag is yes for corresponding locations in RAM 68 for both the second and fourth time periods, the microprocessor 66 interprets this data as being indicative of a target within the first protection zone 20. If a target was only detected during the second time period and not the fourth time period, then the target is located within the second protection zone 22. Similarly, if a target was detected during the fourth time period and not the second time period, then the target is within the third protection zone 24.

After a target has been detected, the microprocessor 66 preferably displays the target distance and position (i.e., protection region) on a suitable display unit 140. The display unit 140 can take the form of any conventional display system known in the art including, but not limited to, light emitting diodes, liquid crystal displays, cathode ray tubes and the like. In addition to displaying target information, the microprocessor 66 preferably passes the target data to a vehicle systems processor 142.

The vehicle systems processor 142 further interfaces the back-up proximity sensor to selected vehicle operations. For example, the vehicle systems processor 142 can provide a signal to a lawn mower blade disable system 144 on a tractor, stopping the motion of the cutting blade when a target is detected. Similarly, the vehicle systems processor 142 can control an automated braking system 146 and/or an engine disable circuit 148 to prevent further motion of the vehicle toward a detected target. In addition, the vehicle systems processor 142 can activate an enhanced driver warning system 150 employing audible, visual and tactile indications such as a vibration mechanism within the driver's seat and/or steering wheel of the vehicle 10. In this manner, a sonic back-up protection system formed in accordance with the present invention can alter the operation of a vehicle to avoid impacting a target located behind the vehicle. Preferably, the vehicle systems processor 142 receives a signal indicative of the vehicle transmission being placed in reverse and only alters vehicle operation when the vehicle 10 is moving, or about to move, in reverse.

SONIC TRANSDUCER DESIGN

An important aspect in implementing a sonic back-up proximity sensor in accordance with the present invention resides in the design of the first and second sonic transducer 12, 14. To obtain 180° of coverage behind a vehicle, it is important that each sonic transducer transmits and receives sonic energy in a sector of at least 90°. However, a conventional audio speaker tends to provide optimum response over a narrower sector, typically on the order of 45° or less.

Figure 7:
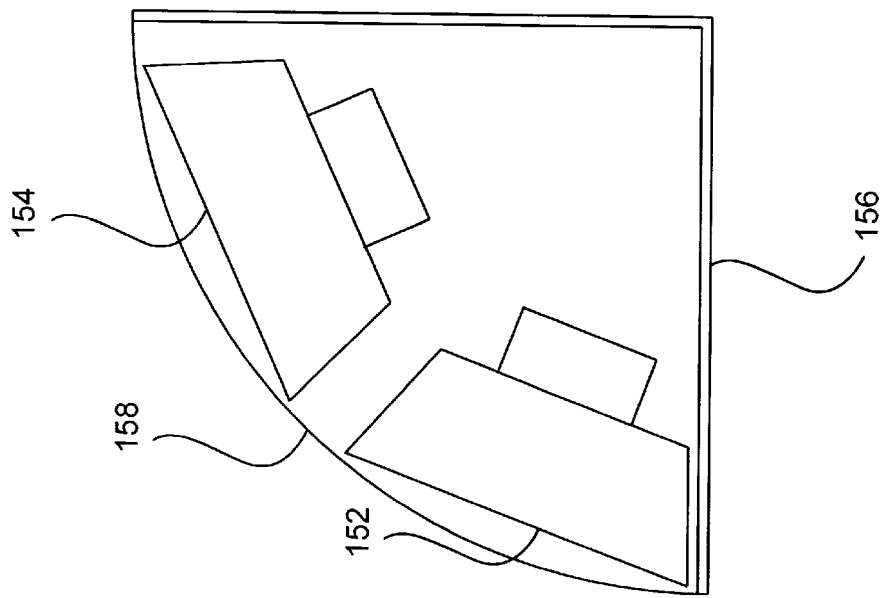
FIG. 7 is a top cross-sectional view of a first embodiment of a sonic transducer formed in accordance with the present invention.

FIG. 7 is a top cross-sectional view of one embodiment of a sonic transducer suitable for use in the present invention. This embodiment employs a first audio speaker 152 and a second audio speaker 154 simultaneously driven by the beep signal to achieve the desired 90° sector. The first audio speaker 152 and second audio speaker 154 are angularly directed at about a 45° angle away from each other. The first audio speaker 152 and second audio speaker 154 each cover a sector of approximately 45° in a substantially adjacent manner, thereby creating the desired 90° sector.

The speakers are preferably mounted in an enclosure 156 which supports the speakers 152, 154 and provides a cavity for directing the sonic energy into the sector. A speaker grille 158 is preferably provided on the face of the enclosure to protect the first audio speaker 152 and second audio speaker 154. The grille 158 is selected such that audio distortion and signal loss is minimized, as would be well known to one skilled in the art.

Figure 8:
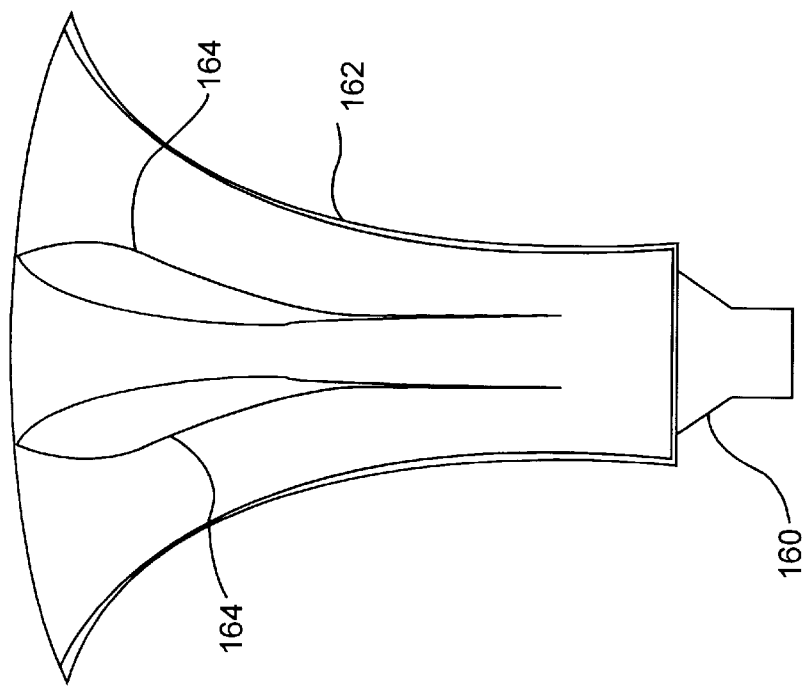
FIG. 8 is a top cross-sectional view of a second embodiment of a sonic transducer formed in accordance with the present invention.

FIG. 8 illustrates an alternate embodiment for a sonic transducer suitable for use with the present invention. The sonic transducer of FIG. 8 employs a single piezo transducer 160 coupled to an acoustical horn 162 to provide coverage over a 90° sector. The piezo transducer 160 directs sonic energy into the horn 162. The horn 162 is shaped such that the sonic energy is distributed over the desired 90° sector. Preferably, the horn 162 is rectangular at its open face, and includes two interior, spaced apart walls 164 which help direct sonic energy over the 90° sector. The wider side of the open face is approximately 7 inches, and the centerline length of the horn is also about 7 inches.

The back-up proximity sensor of the present invention also preferably includes a self-test feature. If a proximity sensor had a single transducer, a self-test would be difficult and might not determine if the transducer were operating properly if no targets were available and thus no reflected signal were received. However, with the present invention, two transducers 12, 14 are employed, and each is angled partially toward the other so that a transmitted signal from one will be received at a certain time by the other, without the need for reflections from targets.

If for example, the first and second transducers 12, 14 are separated from each other on the tractor by two feet, then signals transmitted from one transducer should be directly received by the other in about 1.8 msec after transmission. More specifically, at a transmission frequency of 20 KHz, a preferred transmission burst of 10 pulses will take about 0.5 msec corresponding to about 6.7 inches of sound travel. After transmission is complete, the microprocessor 66 starts the sampling process. The start of the sound burst is not received by the other transducer until an additional sound travel of 17.3 inches. If the two transducers 12, 14 are assumed to be located 24 inches apart, this corresponds to 8.6 sample times of no reception at the other transducer (RAM locations for N=0 through N=8). The received 10 pulse burst of sound will then be received for about 3.3 sample times (samples and RAM locations for N=9 through N=11).

Figure 9:
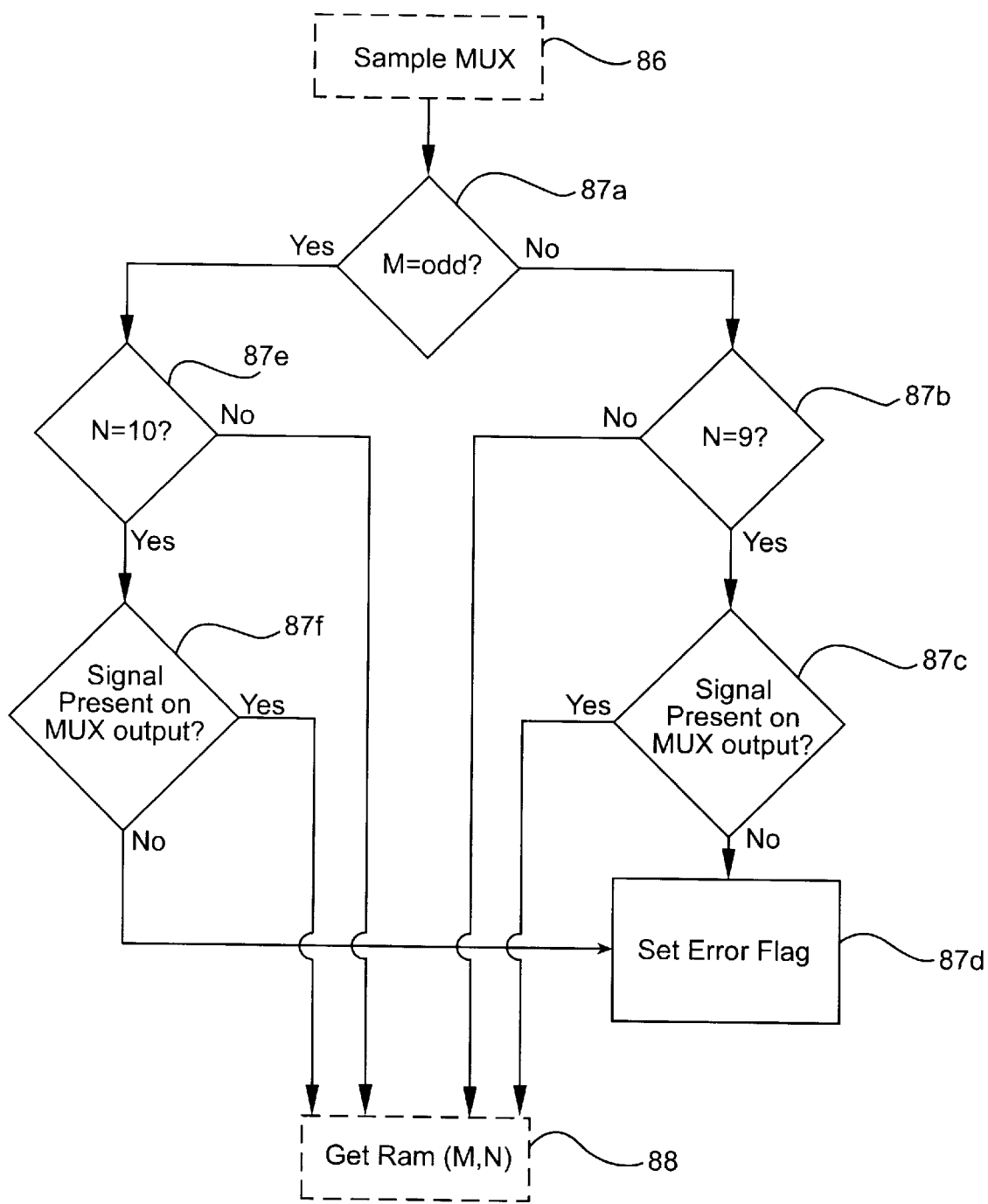
FIG. 9 is a flow chart of a self-test subroutine illustrating the operation of an alternative form of the present invention.

In accordance with a self-test subroutine, as shown in FIG. 9, the microprocessor 66 will monitor the counter to determine if integer N equals a predetermined number, for example, 9 or 10, which would correspond to a signal received by one transducer about 1.8 seconds (i.e., two feet) after it is transmitted by the other transducer. If a signal is present on the output of the MUX 62, then the transducers are functioning properly.

More specifically, in accordance with a self-test subroutine, which preferably begins after MUX 62 is sampled (block 86), the microprocessor 66 determines if the integer M is even or odd (block 87a). If M equals 0 (i.e., even), this means that the first transducer 12 transmitted a signal, and that the DC output from the second transducer 14 should be monitored for a received signal occurring about 1.8 msec later, or at N equal to about 9. The microprocessor 66 determines if N equals 9 (block 87b). If N does not equal 9, then the microprocessor continues with the normal processing routine at block 88.

If N equals 9, then the microprocessor 66 determines if a signal is present on the output of MUX 62 (block 87c). With odd numbered integers, N, the MUX 62 samples the DC output from the second transducer 14 (in this case, M was 0, so the first transducer 12 transmitted the signal). A signal present on the MUX output at 1.8 msec (N=9) after the first transducer 12 transmitted a signal means that the first transducer is working. In such a case, the microprocessor continues with the normal program at block 88. If the expected signal is not present on the output of the MUX 62, then the first transducer 12, or some other component, is not operating properly, and the microprocessor 66 sets an error flag (block 87d) and, preferably, interrupts the normal program.

If the count integer M equals 1 (odd), then the second transducer 14 transmitted a signal. Thus, the MUX 62 must select the first DC output from the first transducer 12 at about 1.8 msec after transmission of the signal. The count integer N must be an even number to sample the output of the first transducer 12, and 1.8 msec corresponds to N being equal to about 10.

The microprocessor 66 determines if N equals 10 (block 87e). If N does not equal 10, the normal routine continues at block 88. If N equals 10, then the microprocessor 66 determines if the expected signal is present on the MUX output, corresponding to the DC output signal from first transducer 12 (block 87f). If a signal is present, the microprocessor 66 continues with the normal routine at block 88. If the expected signal is not present, then an error flag is set (block 87d), and the normal routine is preferably interrupted.

The ultrasonic back-up proximity sensor of the present invention preferably employs several filters and/or filter algorithms which may be implemented by discrete components or carried out by operation of microprocessor 66. Such filters include a difference filter, a 3-point memory cell filter and a 2-point sliding filter.

Figure 10:
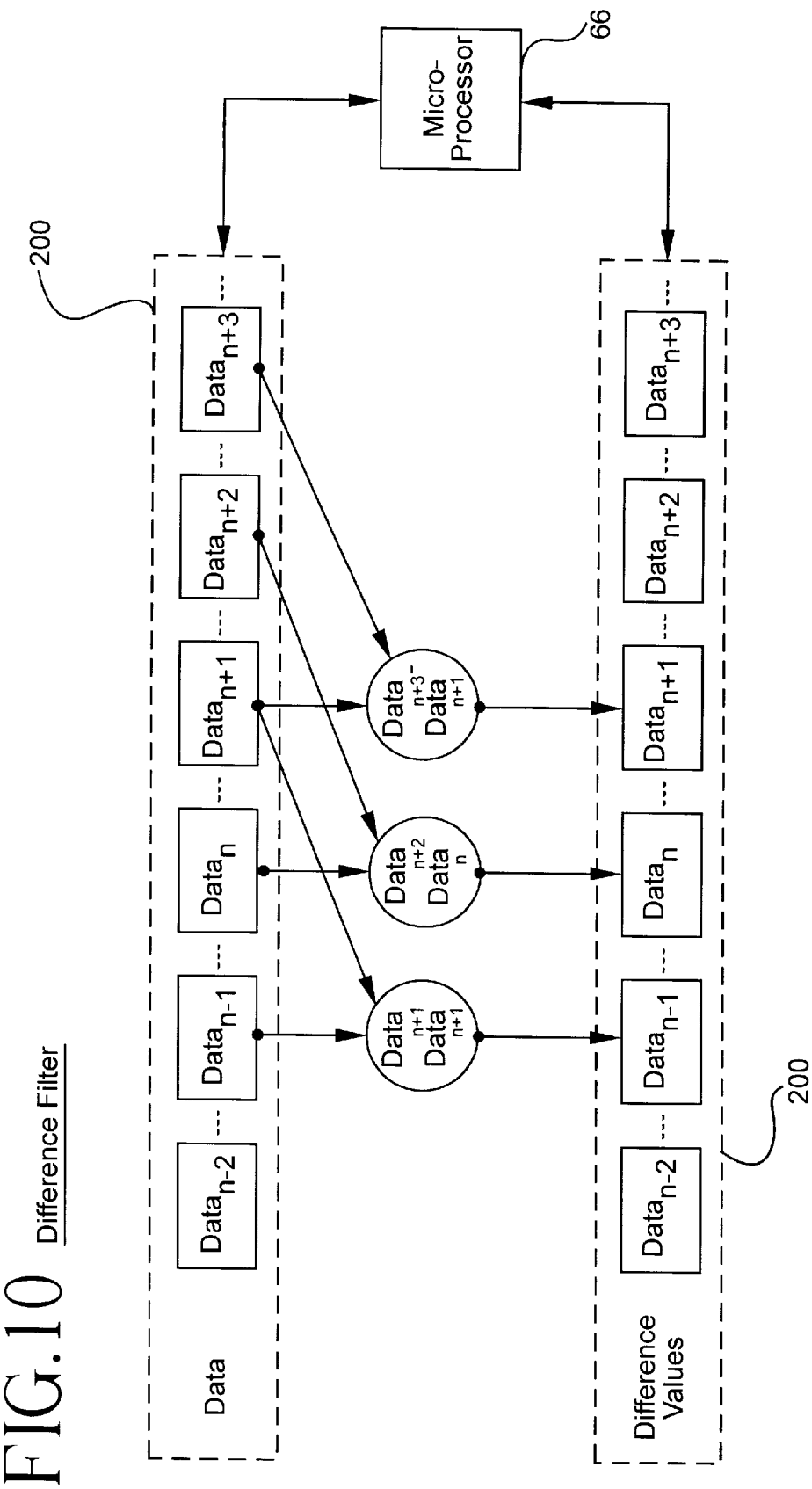
FIG. 10 is a block diagram of a difference filter used in a preferred form of the present invention.

A preferred form of the difference filter is illustrated by FIG. 10. During transmission of the ultrasonic pulse, it is possible that short duration ringing occurs with the transmitted pulse. This ringing may extend a few feet from the sensor, and it is difficult to set any detection threshold, as described previously with respect to the determination of the delta ($\Delta$) value and the data, because the ringing could be relatively severe. During ringing, it is difficult to detect a target. The difference filter is provided for this purpose.

Preferably during the dead time between transmissions, the microprocessor 66 takes the raw sample data and stores it in a second memory RAM 200, and compares the data in one memory location (cell) with the data stored in a lower (previous) memory cell adjacent to it or, more preferably, two places prior to it (in distance). The value of each memory cell of the second RAM is subtracted by the value of the cell two places prior to it in order to determine the difference in the raw data and to detect a positive slope (i.e., positive difference) or negative slope (i.e., negative difference). Using every other cell value for subtraction is preferred in order to increase the difference. Since the ringing is always decreasing, a positive slope is an indication that a target is present during the ringing period. With the difference filter, the back-up proximity sensor of the present invention is capable of detecting targets in shorter ranges (i.e., closer to the transducers 12, 14).

Figure 11:
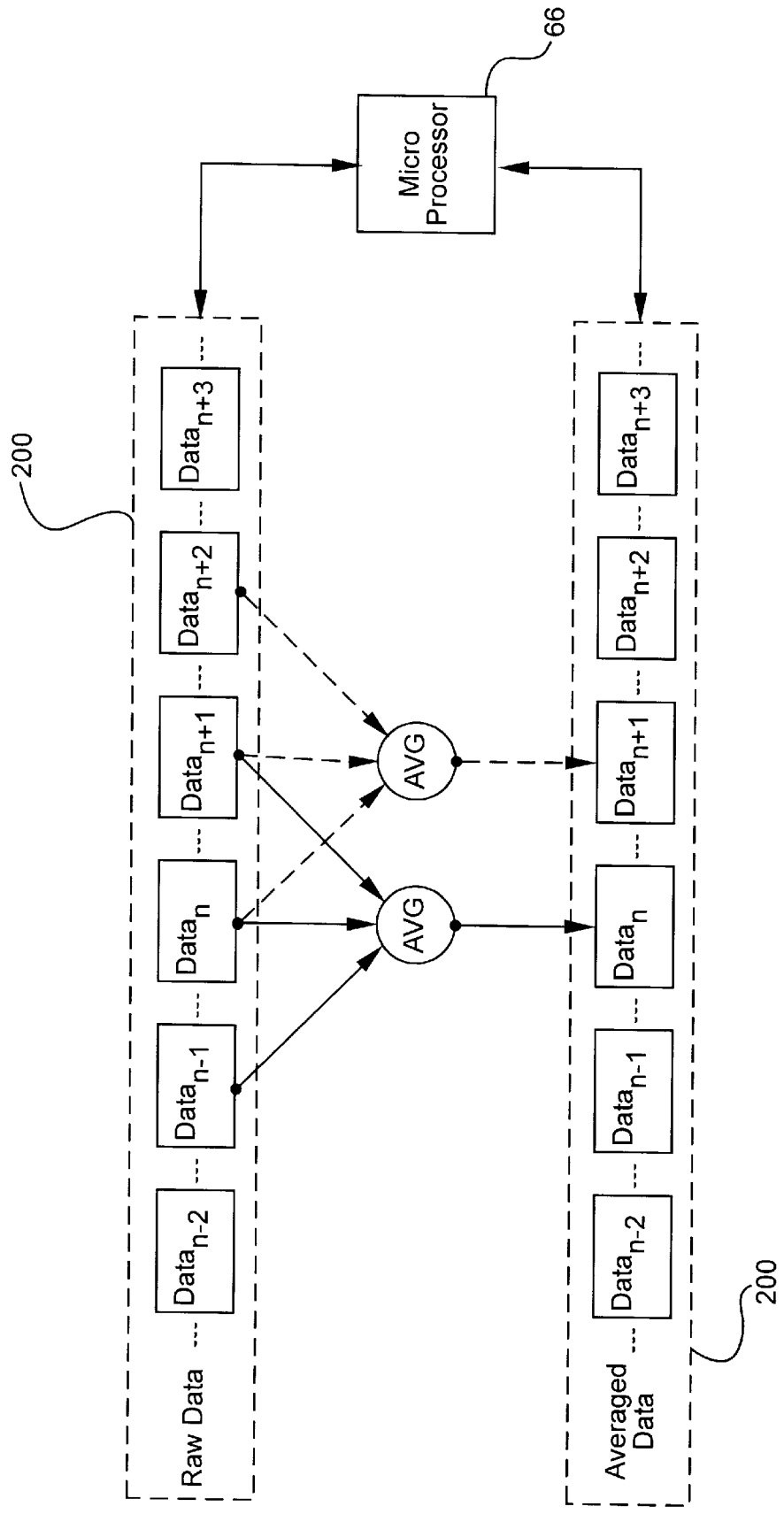
FIG. 11 is a block diagram of a memory cell filter used in a preferred form of the present invention.

The proximity sensor also preferably uses a 3-point memory cell filter, such as that illustrated by FIG. 11. The purpose of this filter is to remove any transients in the raw sample data from cell to cell. The raw sample data is stored in the second RAM 200. The value in each memory cell is averaged by the microprocessor 66 with the values in the adjacent memory cells located before and after it. The averaged value is then substituted for the raw sample data and stored, and is used as the sample data in the detection routine shown in FIG. 6. In effect, the 3-point memory cell filter is a conditioning or pre-filter used prior to operation of the detection algorithm. Of course, it is envisioned to be within the scope of the present invention to use a 5-point, 7-point, 9-point, etc., memory cell filter in place of the 3-point filter described, where additional prior and subsequent memory cells are averaged together with the value of a present cell.

Figure 12:
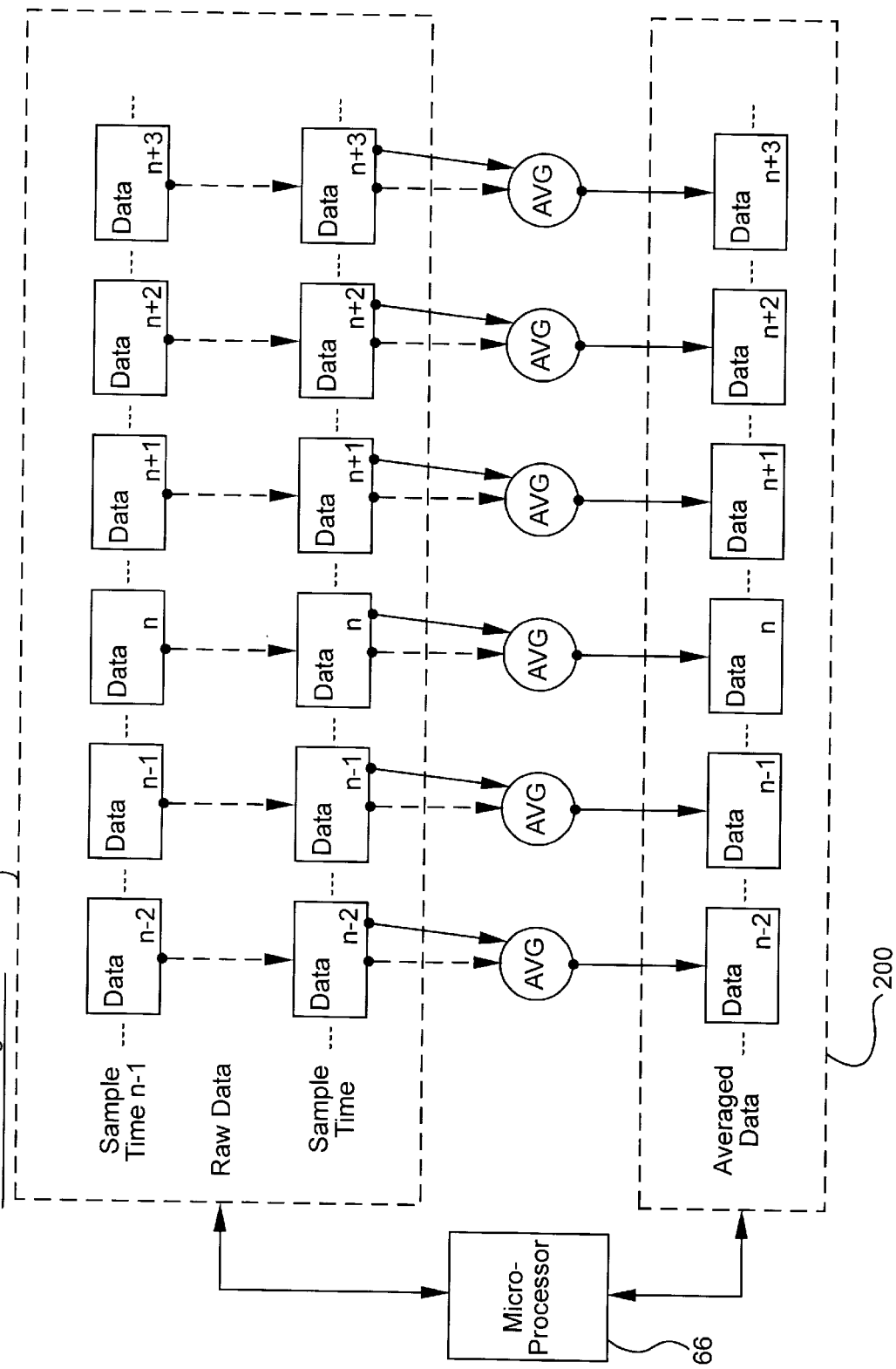
FIG. 12 is a block diagram of a sliding filter used in a preferred form of the present invention.

A 2-point sliding filter is also preferably employed in the proximity sensor. Such a sliding filter is illustrated by FIG. 12. The purpose of this filter is to remove anomalies or transients in the raw sample data from cell to cell.

The 2-point sliding filter averages the raw data over time. The raw sample data from a current sampling (e.g., from a current interval $t_1$–$t_2$) and from a previous sampling (e.g., from a previous interval $t_1$–$t_2$ of a prior cycle) for the same transducer transmitting are stored in the second RAM 200. The same memory cell (i.e., distance) at the current and previous sampling (i.e., time) are averaged and stored in second RAM 200, and this averaged value is then used as the current raw sample data used in the detection routine shown in FIG. 6 and described previously.

A sonic back-up proximity sensor formed in accordance with the present invention provides enhanced protection in an area located behind a vehicle. The present invention provides a sensor which detects targets in three distinct protection regions. The region located directly behind the vehicle is protected by redundant overlapping coverage from a first sonic transducer and a second sonic transducer. The present invention can detect the presence of a target in a 180° region behind a vehicle, and can also render an approximate angular direction of a target (center, left vehicle side, right vehicle side). In addition, a sonic back-up proximity sensor formed in accordance with the present invention can also provide target distance information. By providing target data to a vehicle systems processor, the operation of a vehicle can be altered to avoid impacting a target detected in a region behind the vehicle.

Although illustrative embodiments of the present invention have been described herein with reference to the accompanying drawings, it is to be understood that the invention is not limited to those precise embodiments, and that other changes and modifications may be effected therein by one skilled in the art without departing from the scope or spirit of the present invention.

What is claimed is:

1. A sonic back-up proximity sensor for a vehicle, the sonic sensor comprising:

a first sonic transducer, the first sonic transducer transmitting and receiving sonic energy in a first sector;

a second sonic transducer, the second sonic transducer transmitting and receiving sonic energy in a second sector; and the first sonic transducer and second sonic transducer being substantially horizontally separated and angularly directed such that the first sector and second sector partially overlap, thereby creating a first protection zone, a second protection zone and a third protection zone.

2. A sonic back-up proximity sensor as defined by claim 1, wherein the first sonic transducer transmits sonic energy during a first time period, the first sonic transducer and the second sonic transducer receive reflected sonic energy during a second time period, the second sonic transducer transmits sonic energy during a third time period, the first sonic transducer and the second sonic transducer receive reflected sonic energy during a fourth time period, and the first sonic transducer and the second sonic transducer monitor the first protection zone, the second protection zone, and the third protection zone substantially simultaneously during the second time period and the fourth time period.

3. A sonic back-up proximity sensor as defined by claim 2, wherein the first sector and second sector cover a region of approximately 90 degrees.

4. A sonic back-up proximity sensor as defined by claim 3, wherein the first sonic transducer and second sonic transducer are each angularly directed by 45 degrees toward each other.

5. A sonic back-up proximity sensor as defined by claim 4, wherein the first, the second and the third protection zones protect a combined area of approximately 180 degrees behind the vehicle.

6. A sonic back-up proximity sensor for a vehicle, the sonic sensor comprising:

a transducer interface circuit generating and selectively routing a sonic signal;

a first sonic transducer, the first sonic transducer transmitting the sonic signal generated by the transducer interface circuit into a first sector, the first sonic transducer receiving at least a portion of the sonic signal reflected from a target in the first sector;

a second sonic transducer, the second sonic transducer transmitting the sonic signal generated by the transducer interface circuit into a second sector and receiving at least a portion of the sonic energy reflected from a target in the second sector, the first sonic transducer and second sonic transducer being substantially horizontally separated and angularly directed such that the first sector and second sector at least partially overlap, thereby creating a first protection zone, a second protection zone and a third protection zone; and a detector circuit, the detector circuit generating a first detector output signal in response to sonic energy received by the first sonic transducer and generating a second detector output signal in response to sonic energy received by the second sonic transducer.

7. A sonic back-up proximity sensor as defined by claim 6, wherein the first sonic transducer transmits the sonic signal during a first time period, the first sonic transducer and the second sonic transducer receive at least a portion of the sonic signal reflected from a target during a second time period, the second sonic transducer transmits the sonic signal during a third time period, the first sonic transducer and the second sonic transducer receive at least a portion of the sonic signal reflected from a target during a fourth time period, and the first sonic transducer and the second sonic transducer monitor the first protection zone, the second protection zone, and the third protection zone substantially simultaneously during the second time period and the fourth time period.

8. A sonic back-up proximity sensor for a vehicle as defined by claim 7, wherein the transducer interface circuit comprises:

a tone burst generator, the tone burst generator generating the sonic signal provided to the first sonic transducer and the second sonic transducer; and an alternating logic circuit, the alternating logic circuit receiving the sonic signal from the tone burst generator and alternately directing the sonic signal to the first sonic transducer and the second sonic transducer.

9. A sonic back-up proximity sensor for a vehicle as defined by claim 7, wherein the detector circuit comprises:

a first amplifier circuit operatively coupled to the first sonic transducer and receiving a signal therefrom corresponding to reflected sonic energy received by the first sonic transducer;

a first rectifier circuit operatively coupled to the first amplifier circuit;

a first low pass filter operatively coupled to the first rectifier circuit;

a first level shifting circuit operatively coupled to the first low pass filter, the first level shifting circuit providing the first detector output signal;

a second amplifier circuit operatively coupled to the second sonic transducer and receiving a signal therefrom corresponding to reflected sonic energy received by the second sonic transducer;

a second rectifier circuit operatively coupled to the second amplifier circuit;

a second low pass filter operatively coupled to the second rectifier circuit; and a second level shifting circuit operatively coupled to the second low pass filter, the second level shifting circuit providing the second detector output signal.

10. A sonic back-up proximity sensor for a vehicle as defined by claim 9, wherein the first amplifier circuit and second amplifier circuit are variable gain amplifiers and the detector circuit further comprises:

a gain control circuit, the gain control circuit providing a signal to the first amplifier circuit and second amplifier circuit changing the gain of the amplifier circuits during the second and fourth time periods.

11. A sonic back-up proximity sensor for a vehicle as defined by claim 10, wherein the gain control circuit effects a logarithmically increasing amplifier gain with increasing time during the second and fourth time periods.

12. A sonic back-up proximity sensor for a vehicle as defined by claim 6, further comprising:

a signal processing circuit, the signal processing circuit determining target presence in response to the first output signal and the second output signal.

13. A sonic back-up proximity sensor for a vehicle as defined by claim 12, wherein the signal processing circuit comprises:

a microprocessor;

an analog to digital converter, the analog to digital converter being responsive to the first output signal and the second output signal and providing digital signals to the microprocessor representing the first output signal and second output signal;

a memory circuit, the memory circuit being operatively coupled to the microprocessor and storing the digital signals from the analog to digital converter; and an output circuit, the output circuit being responsive to the microprocessor and providing an indication to an operator of the vehicle that a target is present.

14. A sonic back-up proximity sensor for a vehicle as defined by claim 13, wherein the indication is at least one of a visual signal, an audible signal and a tactile signal.

15. A sonic back-up proximity sensor for a vehicle as defined by claim 14, further comprising a vehicle systems processor, the vehicle systems processor being operatively coupled to the microprocessor and providing a control signal altering the operation of the vehicle when a target is detected.

16. A sonic back-up proximity sensor for a vehicle as defined by claim 15, wherein the vehicle includes a lawn cutting attachment responsive to the control signal, the control signal disabling the lawn cutting attachment when a target is detected.

17. A sonic back-up proximity sensor for a vehicle as defined by claim 15, wherein the vehicle includes an engine responsive to the control signal, the control signal disabling the engine when a target is detected.

18. A sonic back-up proximity sensor for a vehicle as defined by claim 15, wherein the vehicle includes a braking system responsive to the control signal, the control signal engaging the braking system when a target is detected.

19. A sonic back-up proximity sensor for a vehicle as defined by claim 13, which further comprises:

a difference filter, the difference filter being responsive to current digital signals corresponding to current first and second output signals and previous digital signals corresponding to previously occurring first and second output signals and generating an output signal corresponding to the differences between the current digital signals and the previous digital signals which correspond in distance.

20. A sonic back-up proximity sensor for a vehicle as defined by claim 13, which further comprises:

a memory cell filter, the memory cell filter being responsive to at least current digital signals corresponding to current first and second output signals and previous digital signals corresponding to previously occurring first and second output signals and generating an output signal corresponding to the averages of the current digital signals and the previous digital signals which correspond in distance.

21. A sonic back-up proximity sensor for a vehicle as defined by claim 13, which further comprises:

a sliding filter, the sliding filter being responsive to at least current digital signals corresponding to current first and second output signals and previous digital signals corresponding to previously occurring first and second output signals and generating an output signal corresponding to the averages of the current digital signals and the previous digital signals which correspond in time.

22. A method of detecting a target behind a vehicle comprising the steps:

transmitting sonic energy into a first sector during a first time period;

monitoring reflected sonic energy from a target situated within at least one of the first sector and the second sector substantially simultaneously from the first sector and the second sector during a second time period;

receiving reflected sonic energy from a target situated within at least one of the first sector and the second sector during a second time period, the first and second sectors being at least partially overlapping;

transmitting sonic energy into the second sector during a third time period;

monitoring reflected sonic energy from the target situated within at least one of the first sector and the second sector substantially simultaneously from the first sector and the second sector during a fourth time period;

receiving reflected sonic energy from the target situated within at least one of the first sector and the second sector during the fourth time period; and determining target position based on the sonic energy received in the second and fourth time periods.

23. A method of detecting a target as defined by claim 22, wherein the determining step includes the steps of:

determining whether a target is in the first sector, the second sector or both the first and second sectors;

determining a time interval between transmitting and receiving the sonic energy; and determining target distance based on the time interval.

* * * * *